United States Patent [19]

Miller

[11] 4,278,582

[45] Jul. 14, 1981

[54] REMOVAL OF RESIDUAL ACRYLONITRILE MONOMER

[75] Inventor: James R. Miller, Richfield, Ohio

[73] Assignee: The B. F. Goodrich Company, Akron, Ohio

[21] Appl. No.: 124,039

[22] Filed: Feb. 25, 1980

[51] Int. Cl.$^3$ ............................ C08F 6/10; C08F 6/16; C08F 6/24; C08F 6/28
[52] U.S. Cl. ............................ 260/29.6 AN; 210/749; 260/29.6 MP; 260/29.6 MQ; 260/29.6 PT; 260/465.9; 528/487; 528/488; 528/490
[58] Field of Search ................... 528/490, 488, 487; 260/29.6 AN, 29.6 MP, 29.6 MQ, 29.6 PT, 465.9; 210/59, 749

[56] References Cited

U.S. PATENT DOCUMENTS

| | | | |
|---|---|---|---|
| 2,653,966 | 9/1953 | Taylor et al. | 260/465.9 |
| 3,980,600 | 9/1976 | Coffey | 260/29.6 AN |
| 3,998,797 | 12/1976 | Brandli et al. | 528/487 |

FOREIGN PATENT DOCUMENTS 659154  10/1951  United Kingdom .................... 528/489

Primary Examiner—Stanford M. Levin
Attorney, Agent, or Firm—George A. Kap

[57] ABSTRACT

Concentration of residual acrylonitrile monomer is reduced in acrylonitrile copolymers or water in which acrylonitrile is polymerized to a level of less than about 100 ppm by reacting therewith ammonia or ammonium hydroxide, thioalcohols, hydrogen sulfide and its salts, and alkali metal and alkaline earth metal carbonates, phosphates, and silicates.

13 Claims, No Drawings

REMOVAL OF RESIDUAL ACRYLONITRILE MONOMER

BACKGROUND OF THE INVENTION

Acrylonitrile is the basis for a family of important commercial polymers. For example, copolymers of butadiene with less than 50% acrylonitrile provide oil resistant polymers. Copolymers of alkyl acrylates with acrylonitrile provide a range of polymer products. For example, when ethyl acrylate is the major component, oil elastomers are obtained; and when acrylonitrile is the predominant comonomer, useful molded plastic materials are obtained. Copolymers of a major proportion of styrene and minor proportions of acrylonitrile are also useful in modifying vinyl chloride polymers, as moldable plastics and as components as ABS resin blends. Normally, these acrylonitrile containing polymers are prepared by polymerization in water. Even when such polymerizations are substantially complete, there still remains an undesirable amount of unpolymerized acrylonitrile dissolved both in the polymer and the water on the order of several thousand to several hundred parts per million. Normal procedures of stripping by vacuum or steam do not remove all of this undesirable acrylonitrile.

On the basis of animal and human epidemiological data, OSHA has determined that exposure to the volatile and highly toxic acrylonitrile poses a potential carcinogenic risk to humans. In order to minimize employee exposure risks to acrylonitrile, a limit of 2 ppm of acrylonitrile in the air, averaged over eight hours, has been imposed. It has been discovered that the limit of 2 ppm acrylonitrile in air can be achieved and maintained by reducing content of the acrylonitrile monomer in the latex, bulk polymer or waste water containing same to less than about 100 ppm.

SUMMARY OF THE INVENTION

Residual acrylonitrile monomer dissolved in acrylonitrile copolymers and/or water in which acrylonitrile polymers are polymerized or processed, or residual acrylonitrile monomer in water from acrylonitrile processes, can be reduced by adding thereto a reactive substance selected from ammonia or ammonium hydroxide, thioalcohols, hydrogen sulfide and its salts, alkali metal and alkaline earth metal carbonates, phosphates, silicates, and mixtures of such reactive substances. Carbonates, phosphates and silicates of sodium, potassium, calcium and magnesium are effective although thioalcohols, ammonia or ammonium hydroxide are preferred.

More specifically, this invention relates to a process for reducing residual acrylonitrile monomer in a medium containing said acrylonitrile comprising adding to said medium a sufficient amount of a reactive substance to reduce the content of said monomeric acrylonitrile to less than about 100 parts per million in said medium, said reactive substance is selected from the group consisting of ammonia, ammonium hydroxide, thioalcohols, hydrogen sulfide and its salts, alkali metal and alkaline earth metal carbonates, phosphates and silicates, and mixtures thereof. In a preferred embodiment, the medium containing acrylonitrile and the reactive substance is heat treated at an elevated temperature.

DETAILED DESCRIPTION OF THE INVENTION

This invention relates to reduction of acrylonitrile monomer in acrylonitrile-containing medium to the level of less than about 100 ppm, preferably less than about 25 ppm. The acrylonitrile-containing medium contemplated herein includes acrylonitrile latexes which are prepared in water or organic solvents, wastewaters from acrylonitrile processes and other processes wherein the wastewater contains monomeric acrylonitrile, and acrylonitrile homopolymers and copolymers which are devoid of water or an organic solvent and which can be prepared by bulk polymerization.

The aqueous suspensions or dispersions of acrylonitrile polymers used in practicing the present invention are obtained by polymerizing acrylonitrile alone, or more normally with other vinylidene comonomers to form various copolymers therewith. For example, acrylonitrile can be polymerized with about 50 weight percent or more of butadiene, up to about 50 weight percent thereof with about 50–95 weight percent styrene, and about 5–50 weight percent thereof with about 1–99 weight percent of alkyl acrylate(s) such as methyl acrylate, ethyl acrylate, butyl acrylate, methyl methacrylate, and the like. Styrene and acrylonitrile can be polymerized on a butadiene polymer in the well-known ABS resins, and other copolymers.

In addition to butadiene, styrene and alkyl acrylate or alkacrylate wherein the alkyl group contains 1 to 8 carbon atoms, other polymerizable copolymers which can be used in conjunction with acrylonitrile include vinylidene monomers having at least one terminal $CH_2=C<$ group. More specifically, polymerizable comonomers useful in the present invention include other vinyl aromatics such as $\alpha$-methyl styrene and chlorostyrene; $\alpha$-olefins such as ethylene, propylene, and isobutylene; vinyl halides such as vinyl chloride, vinyl bromide, vinyl fluoride, vinylidene chloride, and vinylidene fluoride; vinyl esters such as vinyl acetate; $\alpha,\beta$-olefinically unsaturated nitriles such as methacrylonitrile; alkyl vinyl ethers such as methyl vinyl ether, isopropyl vinyl ether, n-butyl ether, and haloalkyl vinyl ethers such as 2-chloroethyl vinyl ether; acrylates such as n-octyl methacrylate, dodecyl methacrylate, methyl ethacrylate, ethyl ethacrylate, and haloalkyl acrylates such as chloropropyl acrylate, amino-acrylates and methacrylates, and the like; vinyl ketones; vinyl pyridine; $\alpha,\beta$-olefinically unsaturated amides such as acrylamide, N-methyl acrylamide, N-t-butyl acrylamide, N-cyclohexyl acrylamide, diacetone acrylamide, methacrylamide, and N-ethyl methacrylamide; $\alpha,\beta$-olefinically unsaturated N-alkylol amides such as N-methylol acrylamide, N-ethylol acrylamide, N-propylol acrylamide, N-methylol methacrylamide, and N-ethylol methacrylamide; a polyfunctional compound such as methylene-bis-acrylamide, ethylene glycol dimethylacrylate, diethylene glycol diacrylate, allyl pentaerythritol, and divinyl benzene; an $\alpha,\beta$-olefinically unsaturated carboxylic acid monomer containing from 3 to 10 carbon atoms such as acrylic acid, methacrylic acid, crotonic acid, $\beta$-acryloxy propionic acid, hydrosorbic acid, sorbic acid, $\alpha$-chlorosorbic acid, cinnamic acid, $\beta$-styrlacrylic acid, itaconic acid, citraconic acid, maleic acid, fumaric acid, mesaconic acid, glutaconic acid, aconitic acid, and the like. The preferred acid monomers are the $\alpha,\beta$-monoolefinically unsaturated monocarboxylic acids such as acrylic acid and methacrylic acid, and the like, as are known to those skilled in the art. Mixtures of one or more of the above-mentioned monomers can be employed, if desired.

Generally, suitable acrylonitrile polymers will contain about 50 to 70% by weight butadiene or an alkyl acrylate(s) wherein the alkyl group contains 1 to 8 carbon atoms, 20 to 45% of acrylonitrile, and up to about 20% by weight of other polymerizable vinylidene comonomers interpolymerized therein.

The polymer latices may be prepared using any of the conventional polymerization techniques known to those skilled in the art, usually in an aqueous emulsion. The emulsifier may be charged at the outset of the polymerization or may be added incrementally or by proportioning throughout the run. Any of the general types of anionic emulsifiers are used. Typical anionic emulsifier which may be used include those types known to those skilled in the art, for example, as disclosed beginning on page 102 in J. Van Alphen's "Rubber Chemicals", Elsevier, 1956. So-called nonionic emulsifiers are octyl- or nonylphenyl polyethoxyethanol, and the like. Useful as emulsifiers are the alkali metal salts of the aromatic sulfonic acids and the sodium salts of the aromatic sulfonic acids and the sodium salts of the alkyl aryl sulfonates. In addition to the above-mentioned emulsifiers, it may be desirable and advantageous to add post-polymerization emulsifiers and stabilizers to the polymeric anionic latex in order to improve the latex stability if it is to be stored for prolonged periods prior to use. Such post-polymerization emulsifiers may be the same as or different than the emulsifier employed in conducting the polymerization but preferably are anionic or nonionic surface active agents.

To initiate the polymerization, free radical catalysts are employed. The use of such catalysts, although in certain systems not absolutely essential, insures a more uniform and controllable polymerization and a satisfactory polymerization rate. Commonly used free radical initiators include the various peroxygen compounds, azo compounds, and the like. Especially useful as polymerization initiators are the water-soluble peroxygen compounds such as hydrogen peroxide and the sodium, potassium and ammonium persulfates.

The alkali metal and ammonium persulfate catalysts may be employed by themselves or in activated redox systems. Typical redox systems include the persulfates in combination with a reducing substance such as a polyhydroxyl phenol and an oxidizable sulfur compound such as sodium sulfite or sodium bisulfite, a reducing sugar, a diazomercapto compound, a ferricyanide compound, dimethylaminopropionitrile, and the like. Heavy metal ions such as silver, cupric, iron, cobalt, nickel and others may also be used to activate persulfate catalyzed polymerizations. The well known redox systems using organic peroxides and organic hydroperoxides may also be used advantageously. In general, the amount of free radical initiator employed will be in the range of about 0.1 to 5%, based on the weight of the total monomers. The initiator is generally completely charged at the start of the polymerization, however, incremental addition or proportioning of the initiator throughout the polymerization is often desirable.

In conducting the polymerization for the preparation of the latices of the present invention, the monomers are typically charged into the polymerization reactor which contains water and emulsifying agent. The reactor and its contents are then heated or cooled and the polymerization initiator added. The temperature at which the polymerization is conducted is not critical and may range from about 0° C. or lower to about 85° C. or higher. Excellent results, however, have been obtained when the polymerization temperature is maintained between 5° C. and 60° C. Polymerization modifiers such as the primary, secondary, and tertiary mercaptans, buffers, electrolytes, and the like, may also be included in the polymerization.

When at least 90% of the comonomers have copolymerized, more preferably when about 93 to 95% of the monomers have been polymerized, there is added to the polymerization mixture an effective amount of a reactive substance with agitation in order to disperse uniformly the reactive substance. Preferably, about two moles of the reactive substance to one mole of the acrylonitrile monomer is added in order to reduce the monomer content to less than about 100 parts per million, preferably less than about 25 ppm. The reactive substance can also be added to the polymerization reactor, blow-down tank, hold tank or storage tank or to the finished latex. Since it is desirable not to tie up the reactor and the other associated production equipment, addition of the reactive substance should be added to the blow-down, hold or storage tank after removal from the polymerization reactor where reduction of the monomer content can be effected, or in any suitable container preferably equipped with agitation and heating means.

Although discussion so far has been in the context of reducing the monomer content of acrylonitrile latexes, application of this concept is not so limited. For instance, polymers prepared by bulk polymerization from monomers, at least one of which is acrylonitrile, can likewise be treated with such alkaline substances. Such polymers are prepared by heating monomers in absence of water or any solvent. Also applicable for inclusion in the scope of this invention are wastewaters containing acrylonitrile monomer which must be reduced in content before discharging.

Addition of the reactive substance can be made incrementally, in one lump amount, or by proportionation. Of course, incremental and proportionation addition is preferred for obvious reasons. The reactive substance is preferably added in a solution or dispersion form to facilitate uniform distribution thereof in the latex, polymer or wastewater. Water or another liquid medium can be used for solubilizing or dispersing the reactive substance. If it is not desired to introduce the solubilizing or dispersing liquid, the reactive agent can be added in a finely divided powder form. This would especially apply to acrylonitrile copolymers prepared by bulk polymerization. Solids content of the reactive substance in the solution or dispersion can vary widely depending on the specific substance the medium employed. Precaution must be taken not to have too much of the substance in the solution or dispersion which would cause precipitation. Generally speaking, it has been found that aqueous solutions or dispersions containing up to about 2% of the reactive substance perform acceptably, and less dilute solutions or dispersions are preferred.

The temperature of the medium to which the reactive substance is added, and at which reaction between the substance and the acrylonitrile monomer takes place, should be in the range of about 0° C. to 90° C. The higher the temperature, obviously, the quicker the reaction will be and more of the residual acrylonitrile will be removed. Preferably, temperature of the medium should be about 40° C. to 80° C. The pH of the medium must also be controlled to achieve desired results. Generally, pH of the medium after addition of the reactive substance should be about 8 to 12, preferably about 10 to 11. Caution should be exercised wherever the recommended pH is exceeded since at higher pH level, there is a tendency for the polymer particles to become hydrophilic and for viscosity of the medium to increase.

The class of suitable reactive substances include ammonia or ammonium hydroxide, thioalcohols or mercaptans, hydrogen sulfides and its salts, alkali metal and alkaline earth metal carbonates, phosphates, silicates, and mixtures of such alkaline agents. This class includes hypo, meta, pyro and ortho phosphates as well as disilicates, metal and ortho silicates. Carbonates, phosphates and silicates of sodium, potassium, calcium and magnesium are preferred. Mercaptans or thioalcohols of the formula RSH are embraced herein where R can be substituted or unsubstituted, saturated or unsaturated alkyl or a phenyl group preferably containing 2 to 8 carbon atoms. Specific examples of suitable mercaptans include ethanethiol, butanethiols, benzenethiol, propanethiols, hexanethiols, butenethiols, etc. Examples of suitable salts of hydrogen sulfide include ammonium sulfide, sodium sulfide, and potassium sulfide. Preferred salts of hydrogen sulfide are water soluble. Especially preferred reactive substances include sodium carbonate, potassium carbonate, ethanethiol, 1-propanethiol, or benzenethiol. Most preferred is ammonia or ammonium hydroxide.

As should be apparent to one skilled in the art, the approach described herein should be carefully considered in the context of processing a particular copolymer. If the copolymer has carboxyl groups attached to the polymer chain, treatment thereof with an alkaline reactive substance, such as ammonium hydroxide, will neutralize some of the carboxyl groups to the detriment of the crosslinking function of such copolymers. Therefore, it is best to avoid treatment of the carboxylated copolymers with an alkaline reactive substance unless neutralization of the carboxyl groups can be tolerated or in some manner minimized so as not to affect adversely its crosslinking capacity.

The use of emulsifiers in the polymerization reaction should also be considered when applying the approach disclosed herein for reducing monomeric acrylonitrile. Since divalent and trivalent metals are known to interfere with anionic emulsifiers, one should select a suitable emulsifier from the class of cationic and nonionic emulsifiers. Alkaline reactive substances of alkali earth metals perform well in polymerization systems containing cationic or nonionic emulsifiers in conjunction with our invention, however, alkaline reactive substances of alkali metals will perform well with any of the three classes of emulsifiers.

There are certain advantages and disadvantages in using mercaptans or ammonia or ammonium hydroxide versus the other reactive substances. Although mercaptans and ammonia appear to be more effective in scavenging monomeric acrylonitrile, they leave the cyanide group intact. As is well known, a cyanide group in any substance renders such substance toxic and sensitive to skin unless the cyanide group is on a long polymeric chain where its effect is thus diluted. The alkali metal and alkaline earth metal reactive substances hydrolyze the cyanide group to an acrylate salt, such as sodium acrylate, for instance. Acrylate salts, referred to herein, are not toxic nor are they sensitive to the human skin.

Analysis for residual monomeric acrylonitrile was performed pursuant to the head space gas chromatography. This procedure involves placing a one gram sample in a 20 ml vial which is then sealed. One microliter of benzene, as a reference standard, is then injected into the vial. The vial is heated for one hour in an 80°0 C. oil bath and then 3 to 5 ml of head space vapor is transferred by syringe to a Varian 3700 digital gas chromatograph. A ten foot high by ⅛-inch stainless steel 80/100 Porapak PS column is used with on-column injection. The column is programmed at 10° C. per minute from 125° to 250° C. Helium carrier is used. Separate calibrations are necessary for latexes, aqueous solutions and bulk polymers since, on the basis of Raoult's Law, polymer particles suppress the vapor pressure of the benzene reference much more than water.

EXAMPLE 1

A copolymer of butadiene and acrylonitrile was prepared in water to form a latex in accordance with the recipe set forth below where components are given in parts by weight

| | |
|---|---|
| NaHCO$_3$ | 0.2 |
| Butadiene-1,3 | 55 |
| Acrylonitrile | 45 |
| Bisisopropyl Xanthogen Disulfide | 1.0 |
| Water | 150 |
| Potassium Soap of Tallow Acid | 5.0 |
| Na$_2$S$_2$O$_4$ | 0.04 |
| K$_2$S$_2$O$_8$ | 0.3 |
| Daxad 17[(1)] | 1.0 |
| Sequestrene NA$_3$[(2)] | 0.03 |
| Sodium Hexahydroxyheptonate | 0.02 |
| Dimethylamine | 0.02 |

[(1)]Sodium Salt of condensed Naphthalene sulfonate-formaldehyde
[(2)]Trisodium Ethylenediaminetetraacetate.

EXAMPLE 2

Ten milliequivalents of sodium carbonate were added with agitation to same or similar samples of the latex of Example 1 containing about 2200 ppm or mg/kg of residual monomeric acrylonitrile. The samples were maintained at room temperature overnight for about 16 hours and then the residual monomeric acrylonitrile was determined by a gas chromatograph to be 1650 ppm. In this instance, the cyanide group was hydrolyzed in accordance with the following equation:

$$2H_2O + Na_2CO_3 + 2CH_2=CH-C\equiv N \longrightarrow$$
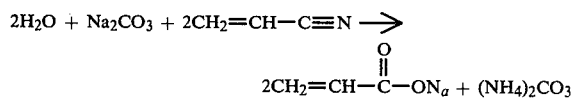

This experiment was repeated with the exception that the latex sample with sodium carbonate was maintained at 80° C. for 3 hours. Residual monomeric acrylonitrile was reduced to 106 ppm, reflecting the positive effect of higher temperature. The samples that were analyzed were aliquots of the latex diluted with an equal amount of water or dilute alkali solution.

EXAMPLE 3

Ammonia, as 2% ammonium hydroxide solution, was added to samples of same or similar latex to that of Example 1 maintained at room temperature containing about 1000 ppm of residual acrylonitrile monomer, Molar ratio of ammonia to acrylonitrile was 2 to 1. Content of residual acrylonitrile monomer was reduced to below 20 ppm, as determined by gas chromatography. In the reaction with ammonia, the cyanide group of acrylonitrile remains intact, as is apparent from the following equations:

$$NH_3 + CH_2{=}CH{-}C{\equiv}N \rightarrow NH_2{-}CH_2{-}CH_2C{\equiv}N \quad (1)$$

$$NH_3 + 2CH_2{=}CH{-}C{\equiv}N \rightarrow NH(CH_2{-}CH_2{-}C{\equiv}N)_2 \quad (2)$$

$$NH_3 + 3CH_2{=}CH{-}C{\equiv}N \rightarrow N(CH_2{-}CH_2{-}C{\equiv}N)_3 \quad (3)$$

Compound (1) constitutes about one-third of the product produced, compound (2) constitutes about two-thirds, whereas only a trace of compound (3) was made.

EXAMPLE 4

To three separate samples of polybutadiene latex containing about 500 mg/kg of residual acrylonitrile were added with agitation ethanethiol, 1-propanethiol, and benzenethiol, respectively, in the ratio of 2 molecules of mercaptan per each molecule of residual acrylonitrile. The samples were kept at room temperature overnight for about 16 hours and then analyzed for residual acrylonitrile by a gas chromatograph. The respective samples treated with mercaptans contained essentially zero, 2 ppm, and 4 ppm of acrylonitrile monomer whereas the control latex showed 450 ppm acrylonitrile. The reaction of acrylonitrile with a mercaptan is as follows:

$$RSH + CH_2CHCN \rightarrow RSCH_2CH_2CN$$

EXAMPLE 5

Several alkaline materials were tested for their efficacy in scavenging residual acrylonitrile in a latex. The latex was B. F. Goodrich Hycar 1561 latex prepared by polymerizing 45 parts by weight acrylonitrile and 55 parts butadiene. Initial content of residual acrylonitrile was on the order of several thousand ppm. At this level, determination of residual acrylonitrile is difficult and imprecise. This is the reason why in some instances it appears that the latex gained in the residual acrylonitrile content. The alkaline material dissolved in water was added to the latex in amount of 0.0011 mole per 100 grams of the polymer in the latex. Two series of tests were carried out: one series with overnight aging at room temperature and the second series with aging at 80° C. for two hours. In each instance, samples were sufficiently agitated after addition of the alkaline materials was made. Results of these tests are set forth in Table I, below:

TABLE I

|  | Residual Acrylonitrile (ppm) | | Initial Latex pH |
|---|---|---|---|
|  | Initial | After Treatment |  |
| Series Aged Overnight at RT |  |  |  |
| Control | very high | very high | 11.4 |
| $Na_2SiO_3 \cdot 9H_2O$ | 4500 | 7000 | 12.1 |
| $K_2CO_3$ | 5800 | 9000 | 11.7 |
| $K_3PO_4$ | very high | 17,000 | 11.8 |
| $Na_3PO_4 \cdot 12H_2O$ | 3900 | 5000 | 12.0 |
| $Ca(OH)_2$ | 5000 | NA | 12.2 |
| $Ca(OH)_2$ Sequestrene $Na_3T$ | very high | 2500 | 12.2 |
| Sodium Silicate Solution, 40–42° Be | 5500 | 5000 | 11.2 |
| Series Aged at 80° C. |  |  |  |
| Control | 1500 | 540 | 10.8 |
| $Na_2SiO_3 \cdot 9H_2O$ | 2300 | 40 | 10.7 |
| $K_2CO_3$ | 1600 | 63 | 10.8 |
| $K_3PO_4$ | 2000 | 300 | 10.8 |
| $Na_3PO_4 \cdot 12H_2O$ | 1500 | 130 | 10.7 |
| $Ca(OH)_2$ | 1100 | 50 | 10.6 |
| $Ca(OH)_2$ Sequestrene $Na_3T$ | 1100 | 46 | 10.7 |
| Sodium Silicate Solution, 40–42° Be | 1300 | 100 | 11.3 |

On the basis of results given above, it should be apparent that heat-treatment of the latex, without addition of any substance, was effective in greatly reducing residual content of acrylonitrile. Heat-treatment of the latex and addition of an alkaline substance reduced acrylonitrile content below about 100 ppm in almost every case. Initial amount of residual acrylonitrile was measured before overnight aging or heat-treatment. The latex samples used in the overnight-aged series contained substantially more residual acrylonitrile than the heat-treated series at 80° C., as should be readily apparent from the data given in Table I, above.

I claim:

1. A process for reducing residual acrylonitrile monomer in a medium containing said acrylonitrile comprising adding to said medium a sufficient amount of a reactive substance to reduce the content of said monomeric acrylonitrile to less than about 100 parts per million in said medium, said reactive substance is selected from the group consisting of hydrogen sulfide, alkali metal and alkaline earth metal phosphates and silicates, and mixtures of said reactive substances.

2. Process of claim 1, said medium is selected from the group consisting of latexes, acrylonitrile homopolymers or copolymers and wastewaters.

3. Process of claim 1 wherein the medium contains up to about several thousand parts per million of monomeric acrylonitrile before addition of said reactive substance and is an aqueous dispersion of an acrylonitrile polymer having been converted from monomers to said polymer to greater than 90% conversion.

4. Process of claim 2 wherein molar amount of said reactive substance is in excess of the molar amount of acrylonitrile monomer present in said medium.

5. Process of claim 4 wherein said reactive substance is added to said medium which is at a temperature of about 0° to 90° C.

6. Process of claim 5 wherein said alkali metal is selected from sodium and potassium; said alkaline earth metal is selected from magnesium, calcium, and barium.

7. Process of claim 6 wherein said reactive substance is added in the form of a dilute aqueous solution or dispersion.

8. Process of claim 6 wherein relative molar proportion of said reactive substance to said residual monomeric acrylonitrile is about 2 to 1.

9. Process of claim 6 wherein said reactive substance is added to said medium which is at a temperature of about 40° to 80° C.

10. A process for reducing residual acrylonitrile monomer in a medium containing up to about several thousand parts per million of monomeric acrylonitrile comprising adding to said medium a sufficient amount of a reactive substance selected from ammonia, ammonium hydroxide, thioalcohols, alkali metal and alkaline earth metal carbonates, and mixtures of said reactive substances, to reduce the content of said monomeric acrylonitrile to less than 100 parts per million in said medium.

11. Process of claim 10 wherein relative molar proportion of said added reactive substance to said residual monomeric acrylonitrile is about 2 to 1.

12. Process of claim 10 wherein said thioalcohols are selected from alcohols having the formula RSH where R can be phenyl or substituted or unsubstituted, saturated or unsaturated alkyl radical of 1 to 18 carbon atoms.

13. Process of claim 11 wherein said thioalcohols are selected from alcohols having the formula RSH where R can be phenyl or substituted or unsubstituted alkyl radical containing 2 to 6 carbon atoms.

* * * * *